May 12, 1931. H. R. POLLEYS 1,804,479
COATING AND MARKING MACHINE
Filed March 31, 1927 5 Sheets-Sheet 1

INVENTOR
Herbert P. Polleys
BY
ATTORNEY

May 12, 1931.  H. R. POLLEYS  1,804,479
COATING AND MARKING MACHINE
Filed March 31, 1927   5 Sheets-Sheet 2

INVENTOR
Herbert R. Polleys
BY
ATTORNEY

May 12, 1931. H. R. POLLEYS 1,804,479
COATING AND MARKING MACHINE
Filed March 31, 1927   5 Sheets-Sheet 3

INVENTOR
Herbert R. Polleys
BY
ATTORNEY

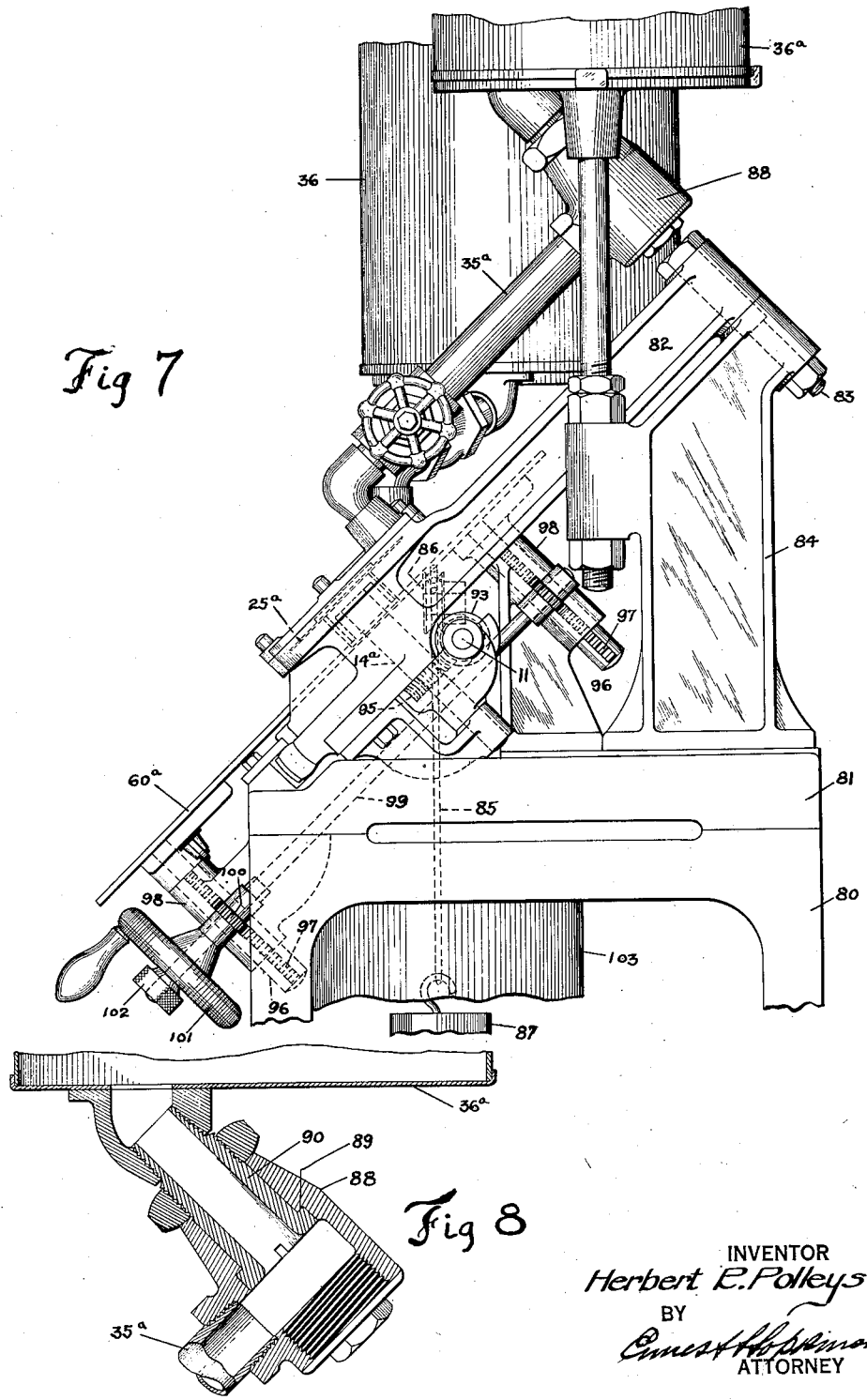

May 12, 1931.  H. R. POLLEYS  1,804,479
COATING AND MARKING MACHINE
Filed March 31, 1927   5 Sheets-Sheet 5
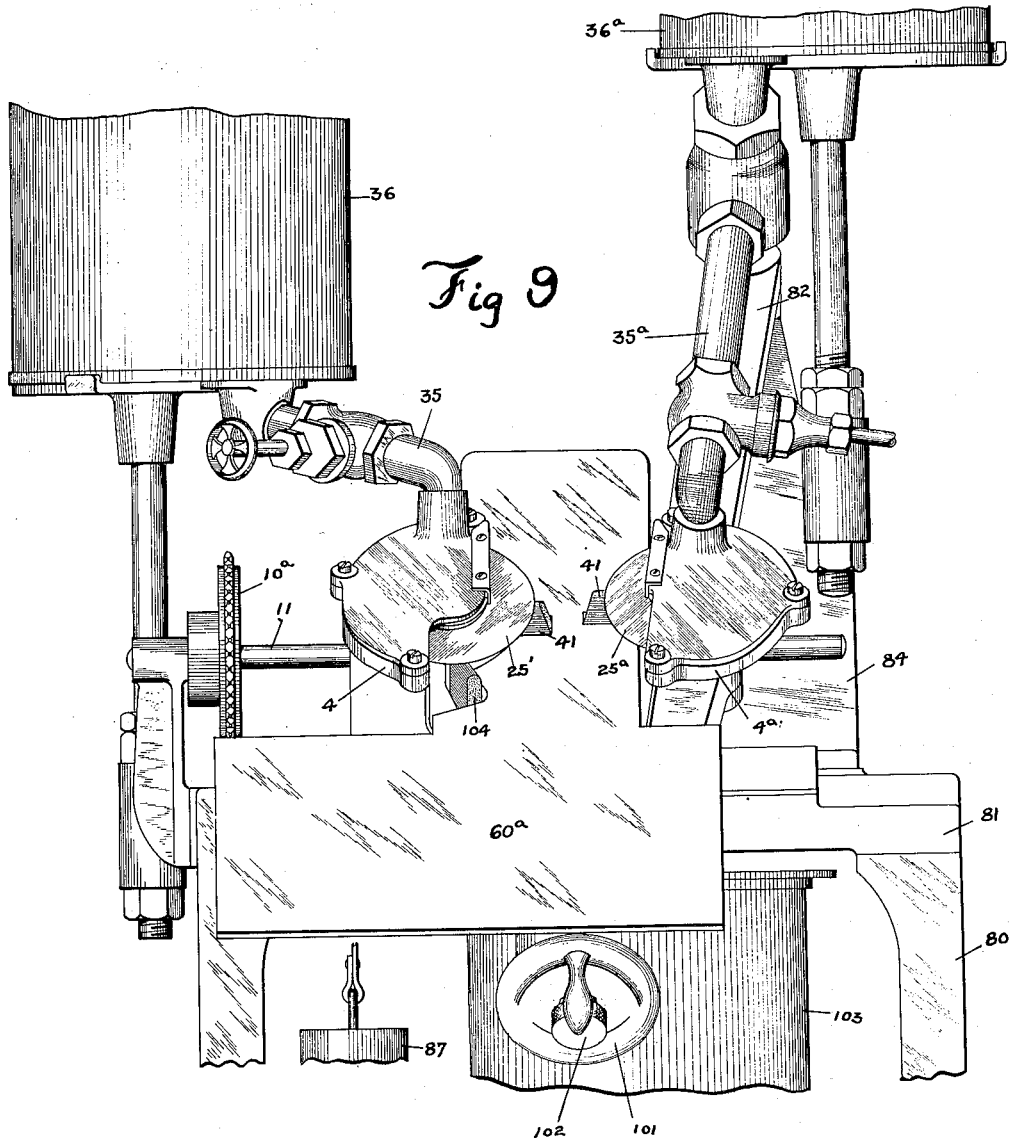
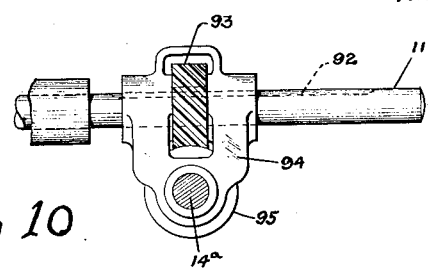
INVENTOR
Herbert R. Polleys
BY
Ernest Hofmann
ATTORNEY Patented May 12, 1931

1,804,479

UNITED STATES PATENT OFFICE

HERBERT R. POLLEYS, OF NEW HAVEN, CONNECTICUT, ASSIGNOR TO NATIONAL INDIA RUBBER COMPANY, OF BRISTOL, RHODE ISLAND, A CORPORATION OF RHODE ISLAND

COATING AND MARKING MACHINE

Application filed March 31, 1927. Serial No. 179,772.

This invention relates to a coating and marking machine, more particularly to a machine for cementing the lower portions of a lasted shoe upper.

In the manufacture of rubber or composite fabric and rubber footwear, it is customary in some styles of such footwear to apply a rubber strip known as a foxing, to the lower portion of a lasted upper, which foxing generally extends between the sole and the upper in the finished article and not only strengthens the article at this point, but in the case of articles with fabric uppers it also waterproofs this portion of the article and strengthens the bond between the edge of the outsole and the shoe upper. In order to secure a better union between the upper and such foxing, it is customary to cement those portions of the upper to which the foxing is applied, and in the case of footwear having fabric uppers, such cementing is in fact essential, since a good bond cannot be obtained directly between the fabric upper and the sheet rubber foxing.

To perform the cementing operation manually requires skilled and highly paid operators, and even then the operation requires considerable time, and a slight irregularity in the cement line mars the appearance of the finished article. In my Patent No. 1,559,367 issued October 27, 1925, there is disclosed a machine for overcoming the difficulties of manual application. The present invention relates to an improved type of such machine.

An object of my invention is to distribute the cement applied to a curved article evenly over the surface of the same, particularly where the curvature is constantly changing from concave to convex. Another object is to vary the wiping effect of the cement applying brush. Still another object is to provide a mechanism for simultaneously cementing both side portions of a shoe while carrying the shoe in a simple forward movement. A further object is to provide for the easy insertion and removal of a brush. For a complete disclosure of the nature and objects of the invention, reference is had to the accompanying specification and to the drawings, in which latter:

Fig. 7 is a side elevation of a modification of the machine;

Fig. 8 is a transverse section through the pipe line of the modified machine;

Fig. 9 is a front elevation of a portion of the modified machine; and

Fig. 10 is a detailed view of the drive shaft of the same.

Figure 1:
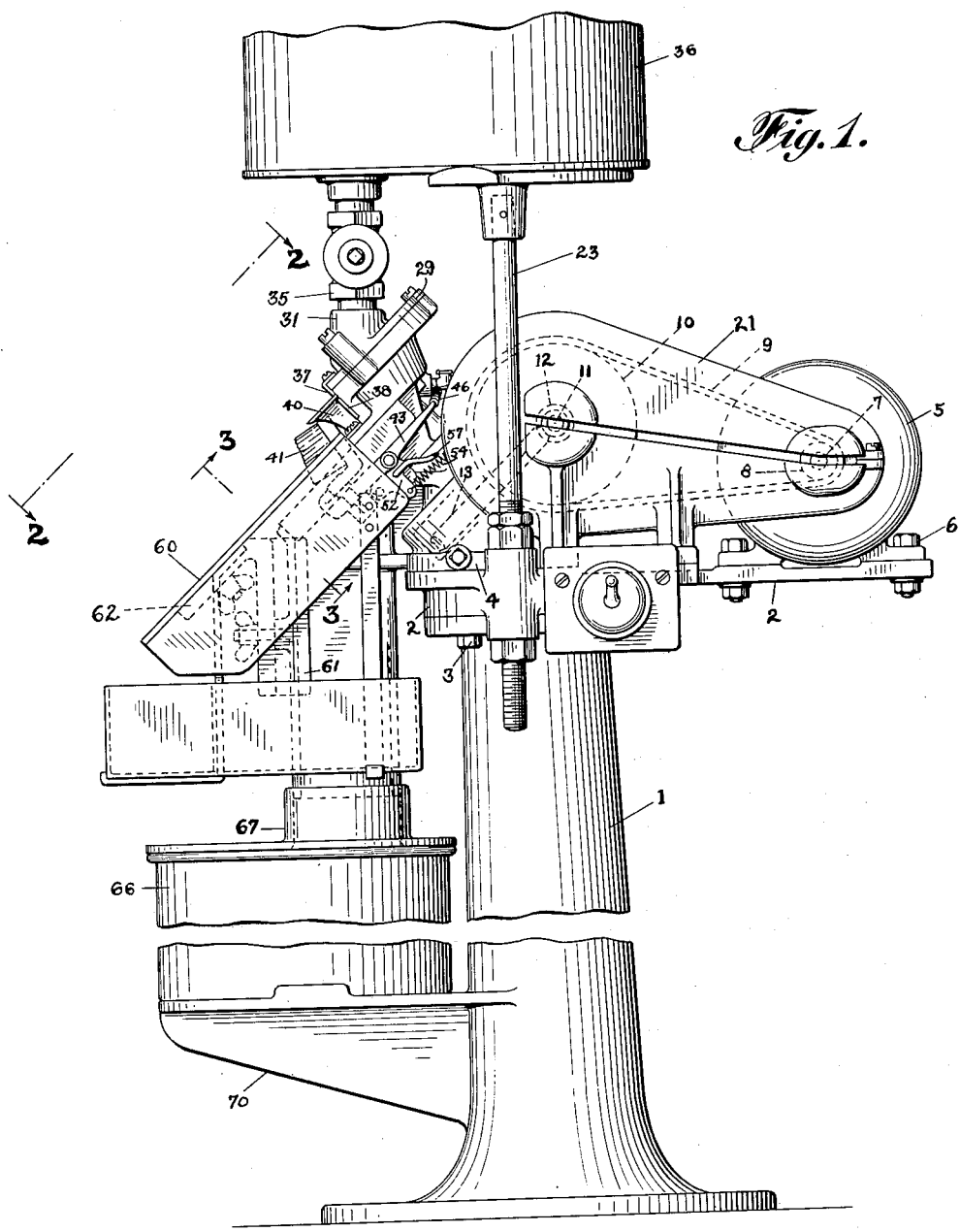
Fig. 1 is a side elevation of the machine.

Referring to the drawings, 1 designates the frame of the machine upon the flanged upper part of which is a table 2 secured by cap screws 3. Screws also secure a head 4 to the table. The head 4 carries the driven parts of the machine. A motor 5 is secured to the table by bolts 6 and carries a drive shaft 7 and pulley 8. A belt 9 connects this pulley with a pulley 10 which is rigidly secured to shaft 11, which latter is journalled in suitable bearings in the head 4. A guard 21 is positioned to cover the pulleys and belt. Shaft 11 carries a worm 12 at its central portion which is adapted to mesh with worm gear 13 rigidly secured to the shaft 14. Shaft 14 rotates in bearings 15 and 16 in the head 4. The shaft is made in two sections, the adjoining ends of each section being provided with protruding tongues which are designed to interfit. A sleeve 17 is rigidly secured to the end of the lower section by a transverse key 18 and extends around a portion of the adjacent section thereby holding the two in alignment. Means for locking together the two shafts is provided by set screw 19, which has screw threaded engagement with one section and is adapted to be tightened against the other section.

At the upper end the shaft extends upwardly through a boss 20 positioned upon the head 4, thereby extending within a cement chamber 24 which is formed within the upper end of head 4. The shaft carries a collar 22 which bears against the end of the boss 20. Mounted upon the upper end of the shaft is a cement distributor 25 provided with distributing disc 25'. The distributor is formed at its lower side with a depending cylindrical flange 26 which is spaced apart from the upper end of the boss 20. On the upper side of the distributor is a slightly elevated central portion 27. Oil is supplied to the upper part of shaft 14 by means of an oiler 28, and due to the extension of the collar 22 beyond the upper end of the boss 20 and also due to the spacing of the flange 26 from the boss, there is no tendency for the cement to work into the bearing of the shaft.

Figure 2:
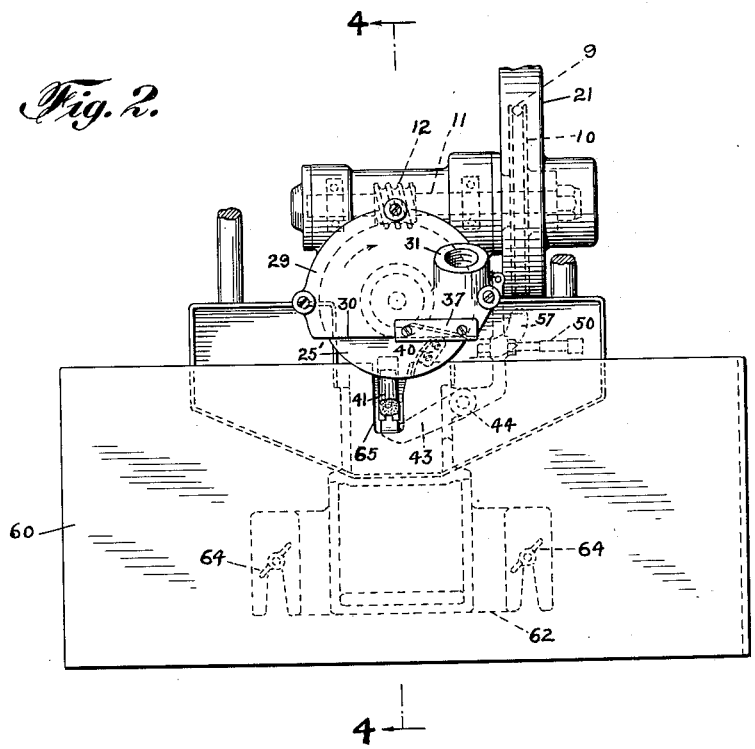
Fig. 2 is a top plan view taken from the line 2—2 of Fig. 1.
Figure 3:
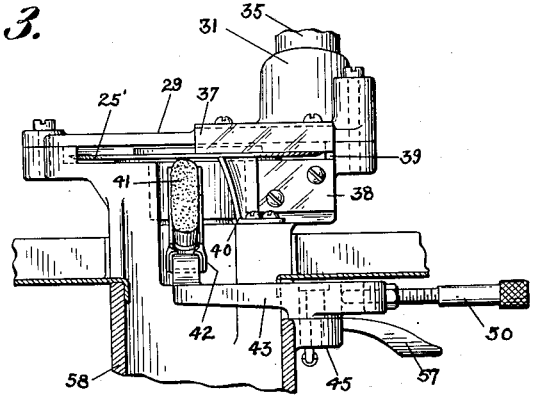
Fig. 3 is a detailed front view of the machine showing the cement disc and brush and taken along the line 3—3 of Fig. 1.

A housing plate 29 is removably secured to the upper portion of the chamber 24 over the distributor 25, but it will be seen that this plate does not entirely cover the disc 25' but is cut away to expose the lower portion of the disc, the cut away edge 30 (Fig. 2) being substantially tangential to the raised circular portion 27 of the distributor. A nipple 31 is formed in the housing plate 29 and a valved supply pipe 35 leading from a tank 36 supported from table 2 by rods 23 is adapted to telescopically or otherwise engage the nipple to supply cement to the upper surface of the distributor 25 and disc 25' with the housing 29. One purpose of the disc 25' is to supply a thickened bead of cement from its edge to a footwear article, and in order that cement may pass out on the exposed portion of the disc only at its edge and under side the following construction is provided: Adjustably secured by screws to the housing plate 29 at its cutaway edge 30 is a scraper 37 which fits against the top surface of disc 25' and also against the raised portion 27. On the lower side of disc 25' and fitted against its projecting hub 26 is a dam plate 38. This is shown more clearly in Fig. 3. Between scraper plate 37 and dam plate 38 at the right hand side of disc 25' there is an opening 39. In the view shown, this opening is substantially rectangular and is designed to extend beneath the disc 25' up to the projecting hub 26. Cement which is deposited partially on the upper surface of the disc 25' and over its edge during operation is carried against plate 37 which forces it from the top surface of the disc over the edge thereof so that the edge and under surface of the disc become coated with cement.

At the under side of disc 25' and between the dam plate 38 and the brush 41, there is a deflector plate 40 which fits closely to the under surface of disc 25', scraping off the excess cement and carrying the same to a position from which it drops over brush 41 and upon the table 60. The brush is yieldingly held in position in order to follow the contour of an article to be coated with cement. It is held in holder clip 42 at an angle of approximately 80° to the disc surface and at the end of a bell crank lever 43 which is pivoted by means of screw 44 to the boss 45. At the extreme end of lever 43, there is attached a spring 46, the other end of which is secured to the head 4 and which exerts a tension on the bell crank 43 so as to hold the brush 41 away from hub 26. By changing the strength of the spring 46 the amount of resistance to the shoe exerted by the brush can be changed to vary the wiping effect. At a point approximately midway between pivot screw 44 and spring 46 on the bell crank arm 43 is an adjustable screw 50 with lock nut 51 which screw is adapted to fit against stop plate 52 in such a manner as to prevent the brush 41 from extending beyond disc 26' except to any desired position within the range of adjustment. It can be seen that by varying the length of screw 50 which projects beyond the bell crank lever, that the lever is prevented from moving outward from hub 26 except to a predetermined distance. This adjustment is used to vary the amount of cement and to take care of various sizes of lasts, etc.

In order to provide for easy removal of the brush, the following arrangement of parts is provided. A stop plate 52 is pivoted by means of a screw 53 at the lower side of the head 4 and is held by spring 54 against the stop pin 56. Spring 54 is secured to stop plate 52 and to a pin 55 on the head 4. By means of the finger presser plate 57 which is a part of and which extends from underneath plate 52, stop plate 52 can be pushed manually downward so as to be clear of the end of the screw 50 and thus allow bell crank lever 43 to be moved by spring 46 in toward the head 4. This allows brush clip 42 to be pulled forwardly by the spring 46 and to clear the edge of disc 25' so as to permit easy replacement of brush 41.

The work to be cemented is carried upon the table plate 60 which is in turn supported by the tubular extension 58 of the head 4. Member 58 carries an angular bracket 62, the lower part 61 of which is slidably engaged and held adjustably in position by means of the stud and slot connection with wing nut 63 locking the same. At the top of bracket 62, the table plate 60 is carried in a plane substantially parallel to the plane of the disc 25'. As shown, the plate 60 is disposed at an angle of about 45° to the vertical, but this angle may be greater or less. Table plate 60 is adjustably secured to bracket 62 by means of stud and slot connections with the wing nuts 64 locking the two parts. Plate 60 has a substantially rectangular shaped opening 65 rounded at the one side so as to allow clearance for the movable brush 41. At the outer end of table 60, brushes (not shown) may be mounted for cleaning excess cement from shoe bottoms as desired. The tubular extension 58 is so positioned as to conduct excess cement into the receiving can 66 through an opening in cover 67. Can 66 is supported upon a bracket 70 rigid with the frame 1. The bracket 62 carries a support 68 for a trough 69 which is positioned beneath the table to catch any waste.

In the modification of the invention illustrated in Figs. 7 to 10 inclusive, a machine is shown in which the footwear to be treated, instead of being given a generally rotary movement against a single brush, can be moved forwardly between two cementing units, each of which consists of a revolving disc and a brush. This mechanism cements both side portions of the shoe, and the heel and toe can be cemented, if desired, by pressing the same against an additional brush conveniently placed. Referring to Figs. 7 and 9, reference numeral 80 designates the frame of the machine upon which is placed the supporting table 81 which carries the housing 4 for the rotary disc 25′. A second disc 25a is carried in a housing 4a which is mounted on the bracket 82. Bracket 82 is pivotally mounted upon a pintle 83 secured to the support 84 which in turn is carried by the table 81. In order to maintain the disc 25a in position, adjacent its cooperating disc, a cable 85 is attached to the swinging bracket 82. The cable passes over a pulley wheel 86 carried by the housing 4 and hangs suspended therefrom with a weight 87 attached thereto.

The disc housing 4a carried by bracket 82 swings in an arc and provision is made to enable the pipe line connecting it to the tank 36a to follow the course of the disc housing. This is accomplished by connecting pipe line 35a by a screw threaded connection with sleeve 88. (See Fig. 8.) Sleeve 88 is counter bored to form a cylindrical cavity adapted to receive the shoulder 89 of the pipe 90 in swiveling engagement. Pipe 90 is attached to the cement tanks 36a.

Driving power for rotating the discs passes through a sprocket 10a and shaft 11 to the stationary disc housing 4 in the same manner as previously described. The disc housing 4a carried by bracket 82 is adapted to swing and in order to connect it with the shaft 11, an elongated keyway 92 (see Fig. 10) is provided which carries a gear wheel 93 keyed thereto in slidable relation. The gear wheel 93 is held in a bracket 94 slidable on shaft 11 and connected to housing 4a. Gear wheel 93 meshes with a gear 95 carried by a shaft 14a on which the disc 25a is mounted. In order to permit housing 4a and bracket 82 to swing and at the same time slide relatively to shaft 11, the latter is formed in two parts connected by a universal joint (not shown).

Provision is made for lowering and raising the work table 60a as follows: Table 60a is mounted on pedestals 96 carrying rack teeth 97 in the surface thereof. The pedestals 96 are carried in slidable engagement by the bosses 98. A rotatable shaft 99 is mounted in bearings carried upon the table 81 and carries rigidly secured thereto pinions 100 so positioned as to mesh with the teeth on each pedestal. A hand wheel 101 is rigidly secured to the shaft 99, and when operated raises or lowers the table 60a. A lock nut 102 is provided to maintain the adjustment.

Tubular member 103 is positioned to collect any cement which may drip from the disc housing. In addition to the two brushes 41 which are mounted as described, a third brush 104 is placed beneath the disc 25′ extending through a slot in the table 60a.

In operation of the single disc machine, the latter is started and cement is supplied to the rotating disc 25′ from the tank 36. Due to the scraper 37 and dam 38, the cement supplied to the disc can only escape from beneath housing 29 through the opening 39 at the under side and edge of the disc, so that in this manner a bead of cement is formed on the exposed edge of the disc as it passes out from the housing 29. The cement on the under side of the disc is scraped off by the deflector plate 40 and falls upon the brush 41. The surplus cement drains down through the tubular projection 58 to the receptacle 66. The operator holds the footwear article 73 upon the table 60 in about the position shown in Fig. 4, pressing it upwardly so as to lightly engage the brush 41 and rotating disc 25′ and at the same time turning the shoe gradually on its bottom. With a rigidly mounted brush all variations in contour in the shoe must be taken up by the bristles, with the result that at a concaved portion such as the shank the pressure of the bristles is light while at a convex portion the pressure is heavy. With my improved construction, as the shoe is pressed against the brush, the bristles not only yield but the brush itself yields bodily in response to the pressure and thereby conforms to the contour of the portion of the last which is pressed against it. This gives approximately even bristle pressure to all points of cement application and the disc insures a uniform height to the foxing line. The upper bristles of the brush are pushed upwardly by the shoe completely closing any gap which may exist between the disc and the brush. In order to change the height of the foxing line, it is only necessary to raise or lower the table bracket 62 by means of the wing nut 63, thereby varying the distance between table 60 and disc 25'. In this manner, a coating of cement is applied along the lower part of the upper by the brush 41 and at the same time the upper draws off the bead of cement from the edge of the disc 25' and due to the position of the disc, the cement bead is applied at the upper edge of the band of cement. Due to the inclination of the brush 41, a portion of the shoe bottom is also cemented and as some of the cement from brush 41 flows on the table 60, this is picked up by the shoe bottom as the shoe is rotated by the operator. The cement on the shoe bottom, may, if desired, be then more uniformly distributed as by passing it across a brush clamped to the end of table plate 60 or in any other desired manner.

In the operation of the modified cementing device illustrated in Figs. 7 to 10 inclusive, the discs are rotated and the cement applied to the upper surface of the discs. A shoe is passed in a simple forward movement between the two brushes 41. The brushes yield backwardly and forwardly on their pivots conforming to the contour of the shoe as the shoe is moved and in addition, the unit comprising brush 41 and disc 25a swings with its supporting bracket 82 thereby providing considerable flexibility between the cementing units. In this way both sides of the shoe are cemented while passing directly between the units, and the heel and toe can be cemented if desired by applying the same to the brush 104.

Figure 4:
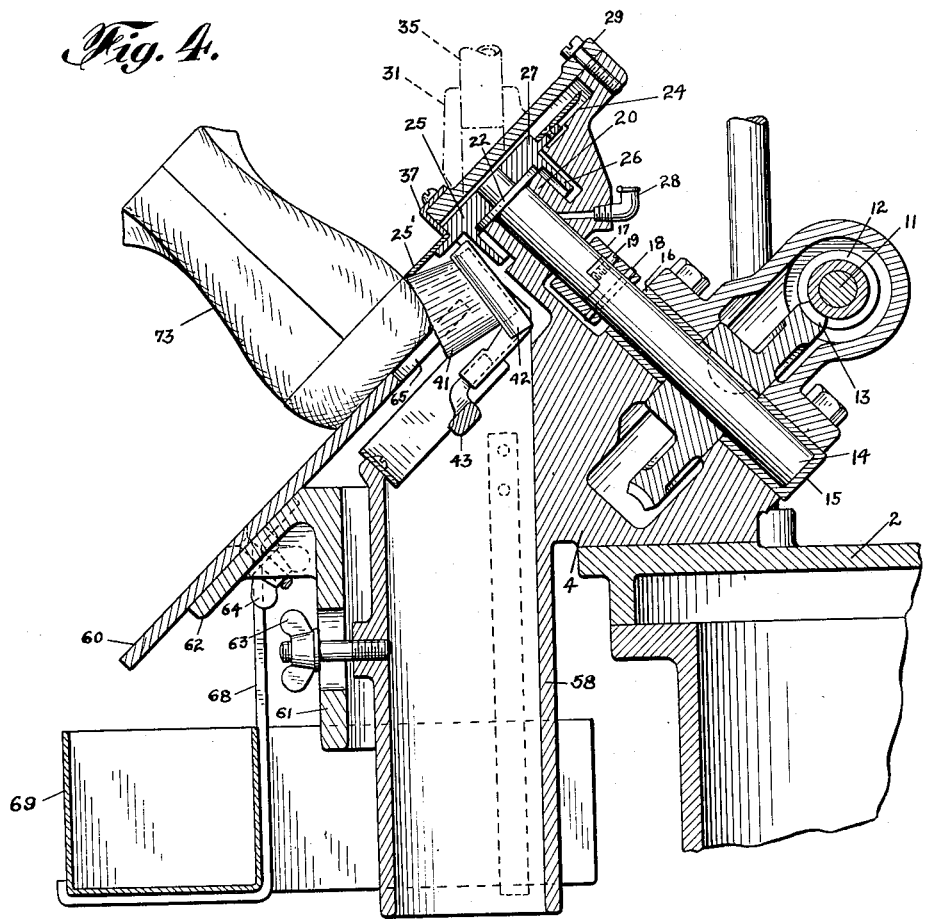
Fig. 4 is a transverse sectional view through the machine along the line 4—4 of Fig. 2.
Figure 5:
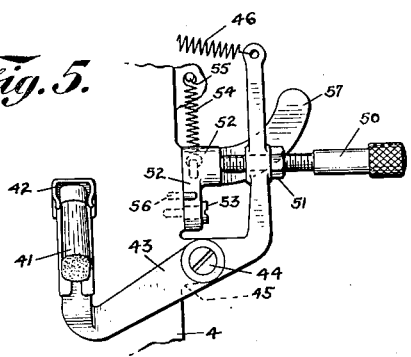
Figs. 5 and 6 are detailed perspective views of the brush holding means.
Figure 6:
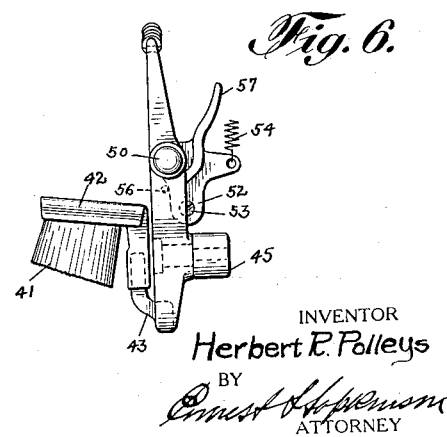

It will be seen that by the invention the cementing operation can be rapidly and accurately performed, and since the shoe rests solidly on its bottom during the cementing operation, as shown in Fig. 4, the cement strip on which the foxing is to be applied will be uniformly straight on its upper edge and without the wavy mark frequently occurring when previous methods of cementing are used. In cases where two or more coats of cement are desired, the same height can be easily duplicated for any number of coats. At the same time, a uniform bead of cement is applied at the upper edge of the foxing cement strip, insuring the proper adhesion of the foxing at its edge and a neat finished shoe without any blotches of cement extending on the upper beyond the foxing. As before pointed out, when rubber foxing or other part is to be applied to a fabric shoe, it is practically essential that a coating of cement be first applied. Moreover, it is necessary, in order to secure a good union, that this cement coating be uniform and thoroughly driven into the interstices of the fabric. With a rigidly mounted brush the coating tends to be superficial and too thick at recessed portions like the shank of the shoe, while at convex portions it will be thinner and properly impregnate the fabric. With the resiliently mounted brush of the present invention, a uniform coating is thoroughly bonded with the fabric, and by varying the spring pressure the thickness of the coating may also be varied. In addition the brushes are inexpensive and easily removed for cleaning or replacement, no drive mechanism is required for them, less cement is required by reason of more even application, the shoes can be immediately turned upside down without requiring drying on racks, thus saving time and eliminating the drying racks.

The machine is simple, easily operated, easily cleaned, and enables rapid work to be done accurately by the operator, thereby lessening the cost of the cementing operation and insuring against any seconds through careless or inexperienced workers. It is not limited to use with footwear articles nor to coating with cement, but may be used for general coating purposes with many other articles.

While a specific embodiment of the machine has been described, it is obvious that the disclosure will suggest numerous modifications to those skilled in the art, and it is not desired to limit the invention otherwise than as set forth in the attached claims.

Having thus described my invention, what I claim and desire to protect by Letters Patent is:

1. In a cementing machine, a flat support upon which the sole portion of a footwear article may be moved while resting thereon, yieldably mounted means extending above the support and yieldably mounted for movement in one plane only whereby a coat of cement can be applied to the lower portion of the upper of the article as the latter is moved on the support, and means for supplying cement to said last means.

2. In a cementing machine, an article support, means whereby a band of cement can be applied to an article on the support, and yieldably mounted means oscillatable to and from the edge of the article when in cement receiving position whereby a thickened bead of cement can be applied to the edge of said band.

3. In a cementing machine, an article support, yieldably mounted means whereby a band of cement can be applied to an article on the support, and yieldably mounted means whereby a thickened bead of cement can be simultaneously applied to the edge of said band.

4. In a cementing machine, an article support, a yieldably mounted brush projecting above said support movable to and from the edge of the article when in cementing position, a rotary disc adjacent the upper end of said brush, and means for supplying cement to said brush and to the edge of said disc adjacent the brush.

5. In a cementing machine, an article support, a yieldably mounted brush projecting above the support movable to and from the edge of the article when in cementing position, a rotary disc adjacent the brush, means for supplying cement to the disc, and means for removing excess cement from the under side of the disc and applying it to the brush.

6. In a cementing machine, an article support, oppositely disposed brushes yieldingly projecting above the support, rotary discs adjacent the brushes at least one of which discs is yieldingly positioned, and adjustable means for supplying cement to the discs and brushes whereby an article passed between them becomes coated with cement.

7. In a coating machine, spaced relatively movable coating units, and an inclined flat article support extending between them, whereby the article may be moved on the support between the units for simultaneous coating on opposite sides, and means for vertically varying the relative positions of the support and coating units to thereby vary the height of the coated area.

8. In a coating machine, a partially enclosed thin edged rotatable fluid distributor, means for supplying fluid to the enclosed portion of the distributor, means for confining fluid to the edge and under side of the exposed portion of the distributor, a flat support for articles to be coated adjustably spaced axially from said distributor, and a flat fluid distributing brush having its brushing edge extending from the edge of the distributor towards said support, said brush being yieldably mounted.

9. In a cementing machine, a flat support upon which an article may be moved while resting thereon, flexible cement applying means projecting above said support and adapted to contact with the lower portion of the article, and a laterally yieldable mounting for said flexible means.

Signed at New Haven, county of New Haven, State of Connecticut, this 26 day of March, 1927.

HERBERT R. POLLEYS.